United States Patent Office 3,449,435
Patented June 10, 1969

1

3,449,435
PROCESS FOR THE CATALYTIC VAPOR PHASE HYDROGENATION OF AN β-UNSATURATED CARBONYL COMPOUND WITH A GASEOUS MIXTURE OF HYDROGEN AND A LOWER ALKANE
Shiro Kudo, Sakai-shi, Yoshihisa Mihara, Yokkaichi-shi, and Seiichi Yada, Sakai-shi, Japan, assignors to Kyowa Hakko Kogyo Co., Ltd., Tokyo, Japan, a corporation of Japan
No Drawing. Filed Apr. 8, 1964, Ser. No. 358,368
Claims priority, application Japan, May 31, 1963, 38/27,755
Int. Cl. C07c 27/06
U.S. Cl. 260—593    9 Claims

ABSTRACT OF THE DISCLOSURE

An improvement in a process for the catalytic vapor phase hydrogenation of an $\alpha,\beta$-unsaturated carbonyl compound by means of hydrogen gas as the hydrogenating agent. According to the present disclosure, the hydrogenation is carried out with a mixture of an alkane of 1 to 3 carbon atoms and the hydrogen gas, whereby the corresponding saturated carbonyl compound and corresponding saturated alcohol are simultaneously produced.

---

This invention relates to a process for simultaneously producing saturated carbonyl compound and saturated alcohol by the catalytic vapor phase hydrogenation of $\alpha,\beta$-unsaturated carbonyl compound.

The heretofore generally employed catalytic vapor phase hydrogenation process for the industrial production of saturated alcohol from $\alpha,\beta$-unsaturated carbonyl compound has entailed the use of a large excess of hydrogen. On the other hand, for the industrial production of saturated carbonyl compound from $\alpha,\beta$-unsaturated carbonyl compound there has been employed either the catalytic liquid phase hydrogenation process or the catalytic vapor phase hydrogenation process, using a catalyst having a strong activity for hydrogenation of the double bond of an $\alpha,\beta$-unsaturated carbonyl compound but a weak activity for hydrogenation of the carbonyl group of $\alpha,\beta$-unsaturated carbonyl compound. In case of producing both a saturated carbonyl compound and a saturated alcohol from an $\alpha,\beta$-unsaturated carbonyl compound, they have been produced separately by the respective different hydrogenation processes, and many studies on each process have been reported.

However, it will be realized that the aforesaid separate and quite different processes are economically disadvantageous where it is desired to produce both a saturated carbonyl compound and a saturated alcohol by hydrogenating an $\alpha,\beta$-unsaturated carbonyl compound, and above all, for the production of both butyraldehyde and butanol by hydrogenating crotonaldehyde. Such a process which could simultaneously produce both in one and the same reactor is industrially of manifest value.

A primary object of the present invention is to embody a novel process for simultaneously producing a saturated carbonyl compound and a saturated alcohol by the catalytic vapor phase hydrogenation of an $\alpha,\beta$-unsaturated carbonyl compound such as an alkenal or an alkenone.

According to the present invention, the aforesaid object of simultaneously producing a saturated carbonyl compound and a saturated alcohol by the catalytic vapor phase hydrogenation of an $\alpha,\beta$-unsaturated carbonyl compound is realized by, briefly stated, effecting the said hydrogenation by means of a mixture of hydrogen gas with a lower alkane, i.e., a hydrocarbon selected from the group consisting of methane, ethane and propane, and controlling the hydrogen concentration in the resultant gaseous mixture to maintain the amount of unreacted $\alpha,\beta$-carbonyl compound extremely small and to give simultaneously a saturated carbonyl compound and a saturated alcohol at an arbitrary ratio. The mixing mol ratio of hydrogen to lower alkane varies from about 1:8 to about 1:1. The hydrogenation is carried out at atmospheric pressure or, advantageously, at an average pressure of 1.0 to 3.0 kg./cm². absolute, the average being the arithmetic mean of the reactor inlet pressure and the reactor outlet pressure.

The process of this invention is especially advantageous for the simultaneous production of butyraldehyde and butanol in a proportion of from 1:20 to 20:1 by weight by hydrogenating crotonaldehyde.

Additionally, the production ratio of saturated carbonyl compound to saturated alcohol can be arbitrarily varied only by controlling the hydrogen concentration in the gaseous mixture of hydrogen and lower alkane, and at the same time the amount of unreacted $\alpha,\beta$-unsaturated carbonyl compound in the products can be maintained extremely small, independently of the production ratio of the two products.

Any conventional catalyst which is effective for accelerating the hydrogenation of an $\alpha,\beta$-unsaturated carbonyl compound to give a saturated alcohol or a mixture of saturated carbonyl compound and saturated alcohol can be used in the present catalytic vapor phase hydrogenation process.

In carrying out the catalytic vapor phase hydrogenation of an $\alpha,\beta$-unsaturated carbonyl compound by using a conventional hydrogenation catalyst, as aforesaid, the production ratio of saturated carbonyl compound and saturated alcohol can be varied within a certain range by changing the feed rate of the α,β- unsaturated carbonyl compound or by changing the mole ratio of hydrogen to α,β-unsaturated carbonyl compound. However, as will be shown in the following examples, a considerable quantity of unreacted α,β-unsaturated carbonyl compound remains in the products, and the mole ratio of hydrogen to the α,β-unsaturated carbonyl compound is limited. Therefore, it is very difficult to control the temperature of the catalyst bed industrially and consequently the local temperature elevation in the catalyst bed causes side-reactions and shortens the catalyst life markedly. It is well known that this local temperature elevation in the catalyst bed may be prevented by admixing a gas of high heat capacity such as steam with the reaction gas. Although admixing a lower alkane with a reaction gas is effective also in the present invention for increasing heat capacity of the whole reaction mixture to prevent local temperature elevation in the catalyst bed, this has a different effect, which is the distinguishing feature of this invention, as compared with the case of admixing an usual inert gas with a reaction gas.

Ordinarily in carrying out a hydrogenation by using a gaseous mixture in which the hydrogen concentration is lowered by admixing an inert gas with pure hydrogen, the hydrogenation rate drops in comparison with the case in which pure hydrogen gas alone is used. All inert gases have such an effect and admixing an usual inert gas with hydrogen only reduces the rate of hydrogenating the double bond and the carbonyl group of an α,β-unsaturated carbonyl compound, and makes no difference between the rates of hydrogenating the double bond and the carbonyl group. Therefore, a relatively considerable amount of unreacted α,β-unsaturated carbonyl compound remains in the product, in the case of lowering the hydrogen concentration in a gaseous mixture of hydrogen and an inert gas.

On the other hand, in carrying out a hydrogenation of an α,β-unsaturated carbonyl compound by using hydrogen gas admixed with a lower alkane such as the methane, ethane or propane of the present invention, there is realized a very remarkable difference between the rates of hydrogenating the double bond and the carbonyl group. Namely, the rate of hydrogenating the carbonyl group drops markedly compared with that of hydrogenating the double band of the α,β-unsaturated carbonyl compound, by admixing lower alkane with the hydrogen. Accordingly, there can be obtained a product with a relatively high content of saturated carbonyl compound without lowering the hydrogen concentration particularly and the residual quantity of unreacted α,β-unsaturated carbonyl compound can be maintained extremely small. As a result, varying the hydrogen concentration in a gaseous mixture of hydrogen and lower alkane makes it possible to maintain the residual quantity of unreacted α,β-unsaturated carbonyl compound extremely small and to vary widely the production ratio of saturated carbonyl compound and saturated alcohol. This invention is further illustrated by the following examples.

Referential example

The catalytic vapor phase hydrogenation of crotonaldehyde is carried out by means of pure hydrogen gas alone, as hydrogenation agent, with the aid of a conventional carrier-supported copper-chromium oxide catalyst (70 cc. volume). Reaction heat is eliminated by circulating a conventional thermal medium. Details and results are shown in Table 1.

TABLE 1

| Run No. | Mole ratio of reaction gases | | L.S.V.* (at 20° C.) | Reaction temperature (° C.) | Reaction Pressure (kg./cm.² abs.) | Composition of products (Wt. percent) | | | |
|---|---|---|---|---|---|---|---|---|---|
| | Croton- aldehyde | Hydrogen | | | | Croton- aldehyde | Butyr- aldehyde | Butyl alcohol | Others |
| 1 | 1 | 3 | 2.22 | 170 | 1.0 | 5.0 | 36.0 | 53.5 | 5.5 |
| 2 | 1 | 3 | 4.92 | 190 | 1.0 | 23.7 | 47.5 | 21.8 | 7.0 |
| 3 | 1 | 1 | 1.00 | 170 | 1.0 | 24.9 | 62.0 | 5.9 | 7.2 |

*Volume of crotonaldehyde fed per catalyst unit volume per hour.

Example 1

In a medium-sized reactor the hydrogenation of crotonaldehyde is carried out in accordance with the process of this invention with the aid of a copper-chromium oxide catalyst as in the Referential Example, the results and details being shown in Table 2.

In the case of Run No. 1, the process of the reaction is detailed as follows:

The height of the layer of the catalyst packed in a reaction tube is 3 meters and the amount of the catalyst packed is 2.7 liters. The reactor is fed with 2.25 kg. of crotonaldehyde and 6.1 m.³ at 20° C. of hydrogen-methane gaseous mixture per hour. At this time, the mole ratio of crotonaldehyde:methane:hydrogen is 1:3.95:4.04 as shown in Table 2. The reaction heat in the catalyst bed is eliminated by circulating a thermal medium whose temperature around the inlet of the reactor is adjusted to 150° C. In this case, the temperature of each part of the catalyst bed is not constant, but ranges from 151° to 250° C. Therefore, the value of the reaction temperature shown in Table 2 is an arithmetic average of the 11 values each measured at every 30 cm. in the axial direction of the catalyst bed. The reaction pressure measured at the outlet of the reactor is 1.6 kg./cm.², but owing to the loss in the catalyst bed, the pressure at the inlet of the reactor is 1.9 kg./cm.². The value of the reaction pressure shown in Table 2 is an arithmetic average of those measured at the inlet and outlet of the reactor. The vapor and gaseous mixture emerging from the reactor are condensed in a condenser and thereafter cooled. The gas, which has been separated from the condensate, is washed to recover a very small amount of useful product contained therein. The amount of gas after washing is 4.57 m.³ at 20° C. This gas contains a very small amount of carbon dioxide or lower hydrocarbons (exclusive of methane) beside methane and unreacted hydrogen. The composition of mixture of the condensate and the substance obtained after washing the gas is determined by distillation and chemical analysis. The results are shown in Table 2. An example of a thermal medium which may be used in carrying out the described process is Dowtherm A (available from Dow Chemical Co., U.S.A.).

TABLE 2

| Run No. | Mole ratio of reaction gases | | | Hydrogen concentration in gaseous mixture of hydrogen and lower alkane (vol. percent) | L.S.V. (at 20° C.) | Reaction temperature (° C.) | Reaction pressure (kg./cm.² abs.) | Composition of Products (wt. percent) | | | |
|---|---|---|---|---|---|---|---|---|---|---|---|
| | Crotonaldehyde | Lower Alkane | Hydrogen | | | | | Crotonaldehyde | Butyraldehyde | Butyl alcohol | Others |
| 1 | 1 | ¹3.95 | 4.04 | 50.5 | 0.989 | 176 | 1.75 | 0.0 | 12.5 | 83.9 | 3.6 |
| 2 | 1 | ¹6.20 | 1.80 | 22.5 | 1.00 | 169 | 1.77 | 0.2 | 70.1 | 25.8 | 3.9 |
| 3 | 1 | ²7.07 | 2.79 | 28.3 | 1.02 | 172 | 1.90 | 0.2 | 47.0 | 49.0 | 3.8 |

¹ Methane.  ² Ethane.

Example 2

The procedure of Example 1 is repeated but with the substitution of mesityl oxide for crotonaldehyde. Details and results are shown in Table 3.

TABLE 3

| Run No. | Mole ratio of reaction gases | | | Hydrogen concentration in gaseous mixture of hydrogen and lower alkane (vol. percent) | L.S.V. (at 20° C.) | Reaction Temp. (° C.) | Reaction pressure (kg./cm.² abs.) | Composition of products (Wt. percent) | | | |
|---|---|---|---|---|---|---|---|---|---|---|---|
| | Mesityl oxide | Lower alkane | Hydrogen | | | | | Mesityl oxide | Methylisobutylketone | Methylisobutylcarbinol | Others |
| 1 | 1 | ¹5.0 | 5.0 | 50.0 | 1.01 | 174 | 1.16 | 0.0 | 75.5 | 23.9 | 0.6 |
| 2 | 1 | ¹6.5 | 2.1 | 24.4 | 1.00 | 171 | 1.74 | 0.0 | 93.0 | 6.2 | 0.8 |

¹ Methane.

Example 3

The procedure of Example 1 is repeated except that crotonaldehyde is replaced by 2-ethyl-hexene-2-al-1. Details and results are shown in Table 4.

TABLE 4

| Run No. | Mole ratio of reaction gases | | | Hydrogen concentration in gaseous mixture of hydrogen and lower alkane (vol. percent) | L.S.V. (at 20° C.) | Reaction temperature (° C.) | Reaction pressure (kg./cm.² abs.) | Composition of Products (Wt. percent) | | | |
|---|---|---|---|---|---|---|---|---|---|---|---|
| | 2-ethylhexene-2-al-1 | Lower alkane | Hydrogen | | | | | 2-ethylhexene-2-al-1 | 2-ethylhexanal-1 | 2-ethylhexanol-1 | Others |
| 1 | 1 | ¹4.72 | 3.28 | 41.0 | 0.90 | 179 | 1.56 | 0.0 | 38.8 | 58.0 | 3.2 |

¹ Propane.

Example 4

The hydrogenation of crotonaldehyde is carried out by the same process as described in Example 2 except that nickel-diatomaceous earth is used as catalyst. Details and results are shown in Table 5.

TABLE 5

| Run No. | Mole ratio of reaction gases | | | Hydrogen concentration in gaseous mixture of hydrogen and lower alkane (vol. percent) | L.S.V. (at 20° C.) | Reaction temp. (0° C.) | Reaction pressure (kg./cm.² abs.) | Composition of products (Wt. percent) | | | |
|---|---|---|---|---|---|---|---|---|---|---|---|
| | Crotonaldehyde | Lower alkane | Hydrogen | | | | | Crotonaldehyde | Butyraldehyde | Butylalcohol | Others |
| 1 | 1 | ¹6.25 | 1.65 | 20.9 | 1.01 | 162 | 1.70 | 0.0 | 33.8 | 60.9 | 5.3 |
| 2 | 1 | 0 | 7.94 | 100 | 0.99 | 164 | 1.69 | 0.0 | 0.9 | 93.7 | 5.4 |

¹ Methane.

Example 5

In order to demonstrate that the process of the present invention is very advantageous as compared with the conventional process in which the hydrogenation is carried out by means of a mixture of hydrogen and the so-called inert gas which does not include methane, ethane or propane according to the present invention, the hydrogenation is carried out by the same process as described in Example 2 except that a gaseous mixture of nitrogen and hydrogen is used in this case. Details and results are shown in Table 6.

In Run No. 1 shown in Table 6, the hydrogenation is carried out while such conditions as the type of the catalyst, the amount and height of the catalyst packed layer, the feed amount of crotonaldehyde, the temperature of the thermal medium measured at the inlet of the reactor, the reaction pressure measured at the outlet of the reactor, the mole ratio of the gaseous mixture to crotonaldehyde, and the hydrogen concentration in the gaseous mixture, are kept quite the same as in Run No. 2 shown in Table 2. Therefore, the reaction temperature and pressure shown by the average values are also about the same in these two runs. The comparative study of Tables 2 and 6 reveals that, in spite of the same hydrogen concentration in the gaseous mixture, the use of a gaseous mixture of hydrogen and methane brings about a larger amount of butyraldehyde in the reaction product as compared with the case of using a gaseous mixture of hydrogen and nitrogen. This is due to the fact, as aforementioned, that the rate of hydrogenating the carbonyl group drops markedly as compared with the case of using a mixture of nitrogen with hydrogen, by admixing methane with the hydrogen. Therefore, when it is desired to form butyraldehyde and butanol by means of a gaseous mixture of nitrogen and hydrogen in a proportion same as in Run No. 2 shown in Table 2 (i.e., butyraldehyde: butanol=70.1:25.8 or 2.72:1), there is an unfavorable

TABLE 6

| Run No. | Mole ratio of reaction gases | | | Hydrogen concentration in gaseous mixture of hydrogen and nitrogen (vol. percent) | L.S.V. (at 20° C.) | Reaction temp. (° C.) | Reaction pressure (kg./cm.² abs.) | Composition of products (Wt. percent) | | | |
|---|---|---|---|---|---|---|---|---|---|---|---|
| | Crotonaldehyde | Nitrogen | Hydrogen | | | | | Crotonaldehyde | Butyraldehyde | Butylalcohol | Others |
| 1 | 1 | 6.20 | 1.80 | 22.5 | 1.00 | 176 | 1.79 | 1.0 | 32.0 | 62.9 | 4.1 |
| 2 | 1 | 6.97 | 1.03 | 12.9 | 1.00 | 172 | 1.81 | 11.2 | 62.2 | 22.8 | 3.8 | outcome in that a great quantity of unreacted crotonaldehyde remains in the reaction product, as shown in Run No. 2 of Table 6. In Run No. 2 shown in Table 6, the procedure conditions are identical with those of Run No. 1 of the same table except the hydrogen concentration in the gaseous mixture.

What is claimed is:

1. A process for the simultaneous production of saturated carbonyl compound and saturated alcohol from the corresponding alkenal or alkenones which comprises subjecting an unsaturated compound selected from the group consisting of alkenals and alkenones to vapor phase catalytic hydrogenation at a temperature of from 150° to 250° C. in the presence of a hydrogenation catalyst and a mixture consisting essentially of hydrogen and an alkane selected from the group consisting of methane, ethane and propane, the molar ratio of hydrogen to alkane in the hydrogen-alkane mixture being from about 1:8 to about 1:1, the amount of hydrogen being varied in accordance with the desired ratio of produced saturated carbonyl compound to saturated alcohol.

2. The process according to claim 1, wherein said catalyst comprises copper-chromium oxide.

3. The process according to claim 1, wherein said catalyst comprises nickel.

4. The process according to claim 1, wherein the unsaturated compound is crotonaldehyde and the concurrently obtained saturated carbonyl compound and saturated alcohol are n-butyraldehyde and n-butyl alcohol, respectively.

5. The process according to claim 1, wherein the unsaturated compound is mesityl oxide and the concurrently obtained saturated carbonyl compound and saturated alcohol are methyl isobutyl ketone and methyl isobutyl carbinol, respectively.

6. The process according to claim 1, wherein the unsaturated compound is 2-ethylhexene-2-al-1 and the concurrently obtained saturated carbonyl compound and saturated alcohol are 2-ethylhexanol-1 and 2-ethylhexanol-1, respectively.

7. In a process for the catalytic vapor phase hydrogenation of an alkenal or an alkenone by means of gaseous hydrogen at an elevated temperature of 150° to 250° C., the improvement which comprises admixing the hydrogen with an alkane having at most three carbon atoms in a molar ratio of about 1:8 to about 1:1, and effecting the hydrogenation with the resultant gaseous mixture.

8. The process according to claim 1, wherein the molar ratio of hydrogen to alkane ranges from about 1:8 to about 1:1.

9. The process according to claim 8, wherein said unsaturated compound is selected from the group consisting of crotonaldehyde, mesityl oxide and 2-ethylhexene-2-al-1.

References Cited

FOREIGN PATENTS 26,950   2/1964   Japan.

BERNARD HELFIN, *Primary Examiner.*

M. M. JACOB, *Assistant Examiner.*

U.S. Cl. X.R.

252—372; 260—601, 638